(12) United States Patent
Kawase

(10) Patent No.: US 9,455,424 B2
(45) Date of Patent: Sep. 27, 2016

(54) BATTERY CONTAINER AND ITS MANUFACTURING METHOD

(75) Inventor: Satomi Kawase, Miyoshi (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 38 days.

(21) Appl. No.: 14/366,321

(22) PCT Filed: Dec. 20, 2011

(86) PCT No.: PCT/JP2011/007131
§ 371 (c)(1),
(2), (4) Date: Jun. 18, 2014

(87) PCT Pub. No.: WO2013/093965
PCT Pub. Date: Jun. 27, 2013

(65) Prior Publication Data
US 2014/0370370 A1    Dec. 18, 2014

(51) Int. Cl.
*H01M 2/02*       (2006.01)
*H01M 2/04*       (2006.01)
*B23K 26/20*      (2014.01)
*H01M 10/052*     (2010.01)

(52) U.S. Cl.
CPC .......... *H01M 2/0217* (2013.01); *B23K 26/206* (2013.01); *H01M 2/024* (2013.01); *H01M 2/0426* (2013.01); *H01M 2/0439* (2013.01); *H01M 2/0473* (2013.01); *H01M 10/052* (2013.01); *H01M 2220/20* (2013.01); *Y02T 10/7011* (2013.01)

(58) Field of Classification Search
None
See application file for complete search history.

(56) References Cited

U.S. PATENT DOCUMENTS

| 2007/0128514 A1* | 6/2007 | Yoshida | H01M 2/0426 429/185 |
| 2010/0028759 A1* | 2/2010 | Ebine | H01M 2/08 429/53 |
| 2010/0258538 A1 | 10/2010 | Suzuki et al. | |

FOREIGN PATENT DOCUMENTS

| JP | 0973211 A1 * | 1/2000 | .......... H01M 2/0426 |
| JP | 2002-175787 | 6/2002 | |
| JP | 2006-19089 | 1/2006 | |
| JP | 2009-146645 | 7/2009 | |
| JP | 2011-129266 | 6/2011 | |

* cited by examiner

*Primary Examiner* — Carlos Barcena
*Assistant Examiner* — Wojciech Haske
(74) *Attorney, Agent, or Firm* — Finnegan, Henderson, Farabow, Garrett & Dunner, LLP

(57) ABSTRACT

A battery container 10 includes a case member 1, one side of the case member 1 being opened, and a closing member 2 for closing the opening. Further, a material-shortage section 24 is formed near a welding section 13, the case member 1 and the closing member 2 being brought into contact with each other and welded in the welding section 13 by irradiating the welding section 13 with a welding beam. Further, the case member 1 is welded with the closing member 2 so that the welding section 13 reaches the material-shortage section 24. Note that a width of the material-shortage section 24 in a welding beam irradiation direction may be equal to or greater than one third of a fusion depth of the welding section 13.

11 Claims, 15 Drawing Sheets

BATTERY CONTAINER AND ITS MANUFACTURING METHOD

CROSS-REFERENCE TO RELATED APPLICATIONS

This application is a national phase application of International Application No. PCT/JP2011/007131, filed Dec. 20, 2011, the content of which is incorporated herein by reference.

TECHNICAL FIELD

The present invention relates to a battery container formed by joining a case member whose one side is opened with a closing member for closing the opening by welding, and its manufacturing method.

BACKGROUND ART

In recent years, various batteries have been used as power supplies for mobile terminals, electric vehicles, hybrid cars, and so on, and various battery containers for such batteries have been proposed. For example, a method of manufacturing a battery container including a case member for containing a battery member therein and a closing (member for closing an opening, in which a projection of the case member is joined with a projection of the closing member by welding, is known (see, for example, Patent Literature 1).

CITATION LIST

Patent Literature

Patent Literature 1: Japanese Unexamined Patent Application Publication No. 2009-146645

SUMMARY OF INVENTION

Technical Problem

However, in the above-described manufacturing method disclosed in Patent Literature 1, there is a possibility that the projection will be melted and fall off when, for example, the projection is small and the energy of the welding beam is high, thus causing faulty welding.

The present invention has been made to solve this problem and a main object thereof is to provide a battery container whose reliability is improved by performing optimal welding, and its manufacturing method.

Solution to Problem

An aspect of the present invention for achieving the above-described object is a battery container including: a case member, one side of the case member being opened; and a closing member for closing the opening, in which a material-shortage section is formed near a welding section, the case member and the closing member being brought into contact with each other and welded in the welding section by irradiating the welding section with a welding beam, and the case member is welded with the closing member so that the welding section reaches the material-shortage section.

In this aspect, a width of the material-shortage section in a welding beam irradiation direction may be equal to or greater than one third of a fusion depth of the welding section.

In this aspect, a thick-wall section may be formed along the welding beam irradiation direction, the thick-wall section being thick toward an outer side of the case member or the closing member. Further, the welding section may be welded so that the welding section is confined within a range of the thick-wall section.

In this aspect, the thick-wall section may include a thickness gradually-changing section and a constant thickness section, the thickness gradually-changing section getting gradually thicker toward an outer side, the constant thickness section being integrally formed with the thickness gradually-changing section and having a constant thickness. Further, a value obtained by subtracting a thickness of a normal wall other than the thick-wall section from a thickness of the constant thickness section may be equal to or greater than one third of the fusion depth of the welding section.

In this aspect, a value obtained by subtracting a height of the thickness gradually-changing section from a height of the thick-wall section may be equal to or less than the fusion depth of the welding section.

In this aspect, the material-shortage section may be formed in a groove shape in at least one of an outer edge of the closing member and the opening of the case member along an entire circumference or intermittently in parts of the outer edge or the opening.

In this aspect, the material-shortage section may be formed by cutting off a top-surface corner of the closing member in an obliquely downward direction along the outer edge of the closing member near the welding section so that the closing member has a curved-surface corner.

In this aspect, the case member may be joined with and hermitically enclosed by the closing member by laser welding.

Further, another aspect of the present invention for achieving the above-described object is a manufacturing method of a battery container formed by joining a case member whose one side is opened with a closing member for closing the opening by welding, the manufacturing method including: a step of forming a material-shortage section near a welding section, the case member and the closing member being brought into contact with each other and welded in the welding section by irradiating the welding section with a welding beam, and a step of performing the welding so that the welding section reaches the material-shortage section.

In this aspect, a width of the material-shortage section in a wielding beam irradiation direction may be equal to or greater than one third of a fusion depth of the welding section.

In this aspect, in the case member or the closing member, a thick-wall section may be formed along the welding beam irradiation direction, the thick-wall section being thick toward an outer side of the case member or the closing member. Further, the welding section may be welded so that the welding section is confined within a range of the thick-wall section.

Advantageous Effects of Invention

According to the present invention, it is possible to provide a battery container whose reliability is improved by performing optimal welding, and its manufacturing method.

DESCRIPTION OF EMBODIMENTS

Figure 1:
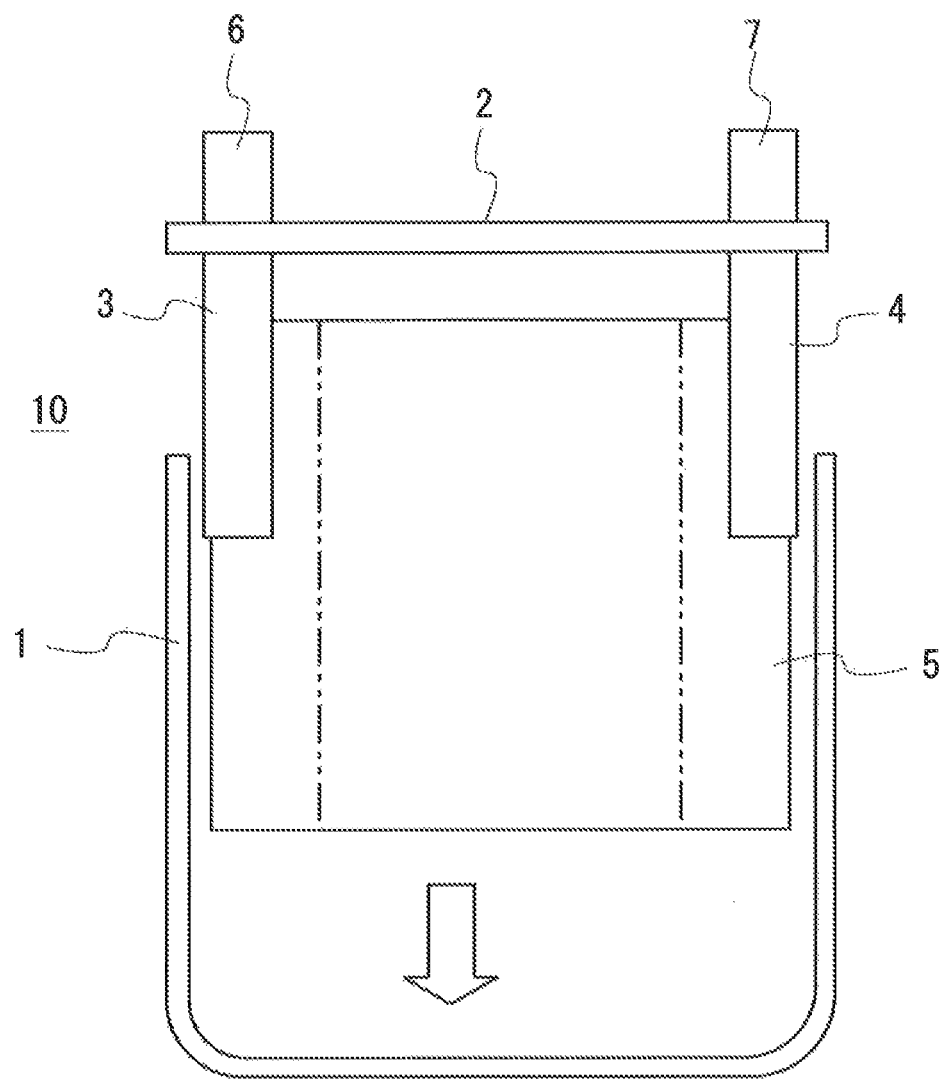
FIG. 1 shows a schematic configuration of a battery container according to an exemplary embodiment of the present invention.
Figure 2:
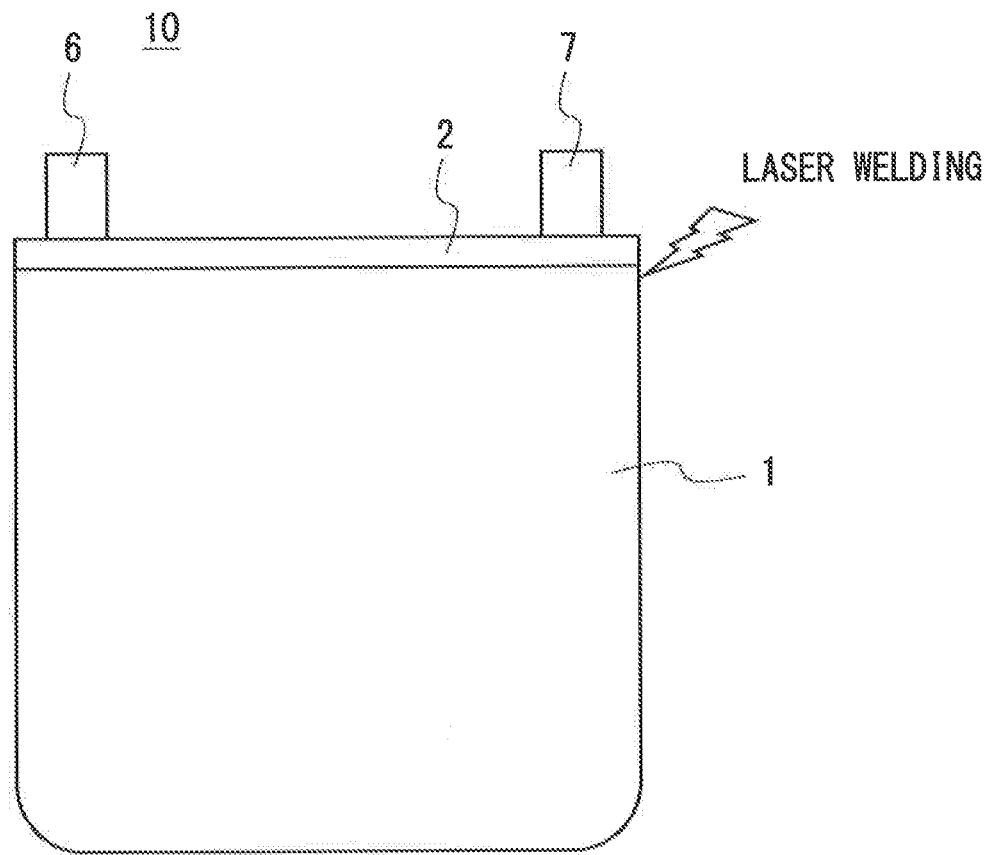
FIG. 2 shows a schematic configuration of a battery container according to an exemplary embodiment of the present invention.

Exemplary embodiments according to the present invention are explained hereinafter with reference to the drawings. FIGS. 1 and 2 show a schematic configuration of a battery container according to an exemplary embodiment of the present invention.

A battery container 10 according to this exemplary embodiment includes a case member 1 whose one side is opened, and a closing member 2 for closing an opening section 11. The case member 1 is provided for containing a battery member therein. In the closing member 2, a positive collector terminal 3 to which an external positive terminal 6 is connected and a negative collector terminal 4 to which an external negative terminal 7 is connected are attached.

Electrode members 5 are connected to the bottom sides of the positive collector terminal 3 and the negative collector terminal 4. Then, these electrode members 5 connected to the bottom sides of the positive collector terminal 3 and the negative collector terminal 4 are housed inside the case member 1, and the opening section 11 of the case member 1 is closed by the closing member 2. Further, the case member 1 is joined with the closing member 2 by laser welding or the like and thereby hermetically enclosed by the closing member 2. In this way, the battery container 10 according to this exemplary embodiment is formed as a rectangular enclosed-type lithium-ion secondary battery having a roughly rectangular parallelepiped shape, for example, and used in an electric vehicle, a hybrid car, a mobile terminal, and so on.

Figure 3:
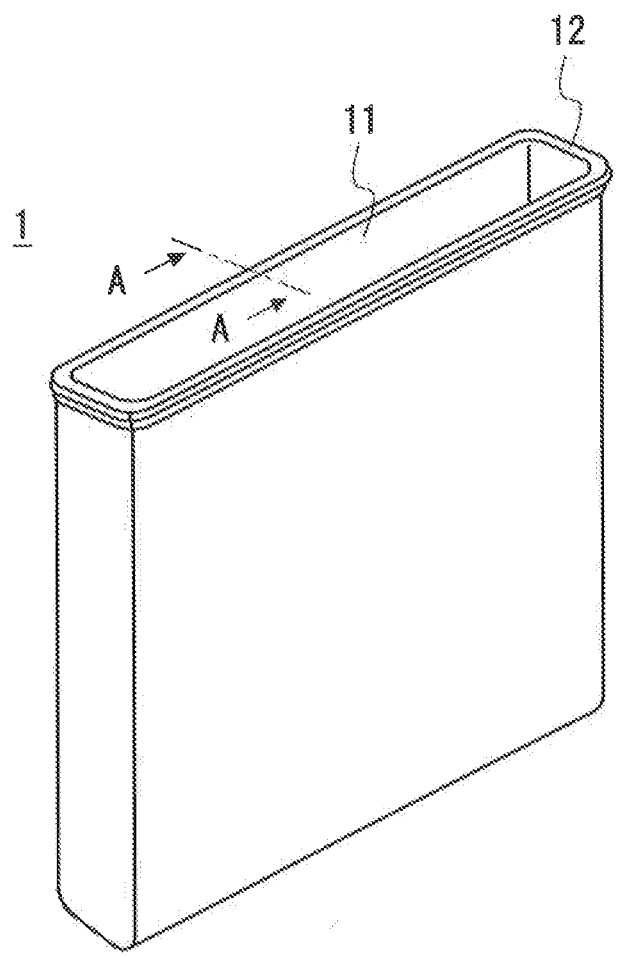
FIG. 3 is a perspective view showing a schematic configuration of a case member according to an exemplary embodiment of the present invention.

FIG. 3 is a perspective view showing a schematic configuration of a case member according to this exemplary embodiment. As shown in FIG. 3, the case member 1 is formed in a roughly rectangular parallelepiped shape, for example, by using a lightweight metal such as aluminum. Further, its top surface is opened.

Figure 4:
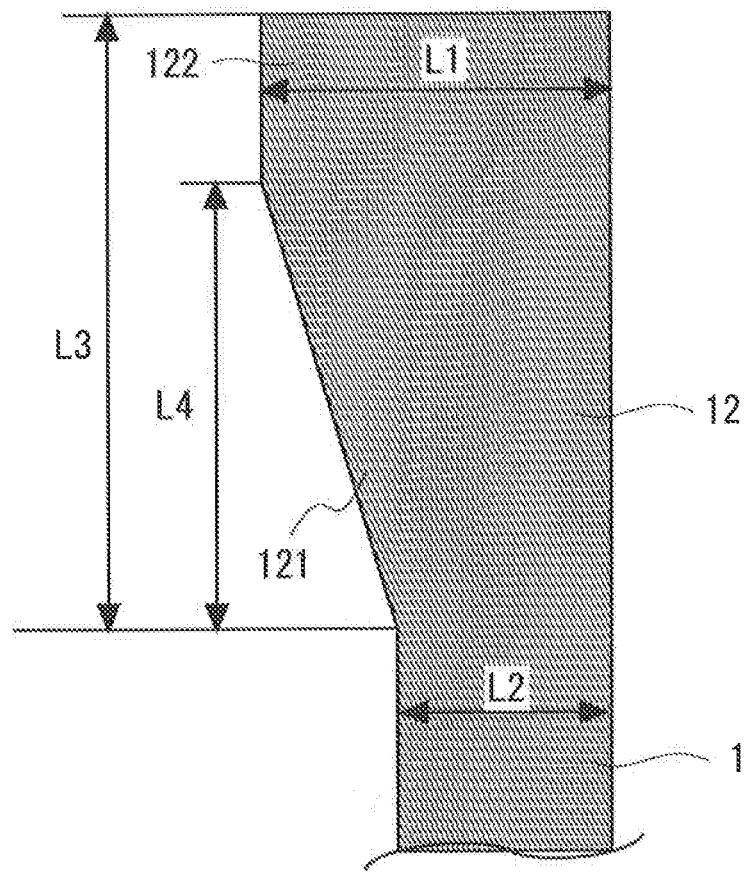
FIG. 4 is an enlarged cross section of a part of the battery container shown in FIG. 3 when the battery container is cut off along the line A-A.

FIG. 4 is an enlarged cross section of a part of the battery container shown in FIG. 3 when the battery container is cut off along the line A-A. As shown in FIG. 4, the strength and the sealing property of the case member 1 are improved by forming a thick-wall section 12 along the opening section 11 of the case member 1. The thick-wall section 12 includes a thickness gradually-changing section 121 whose thickness gradually increases toward the outer side as the distance from the upper edge decreases, and a constant thickness section 122 integrally formed with the thickness gradually-changing section 121 and having a constant thickness.

Further, it is preferable that the value expressed as "(thick-wall section plate thickness L1)−(normal wall plate thickness L2)" be equal to or greater than one third of the fusion depth A (FIG. 8) of a welding section 13 (L1−L2≥A/3) when the case member 1 is welded with the closing member 2. Further, it is preferable that the value expressed as "(thick-wall section height L3)−(thickness gradually-changing section L4)" be equal to or less than the fusion depth A of the welding section 13 (L3−L4≤A). Note that in this exemplary embodiment, although the case member 1 includes the thick-wall section 12 along the opening section 11, the present invention is not limited to this configuration. That is, the case member 1 does not necessarily have to include the thick-wall section 12.

Figure 5:
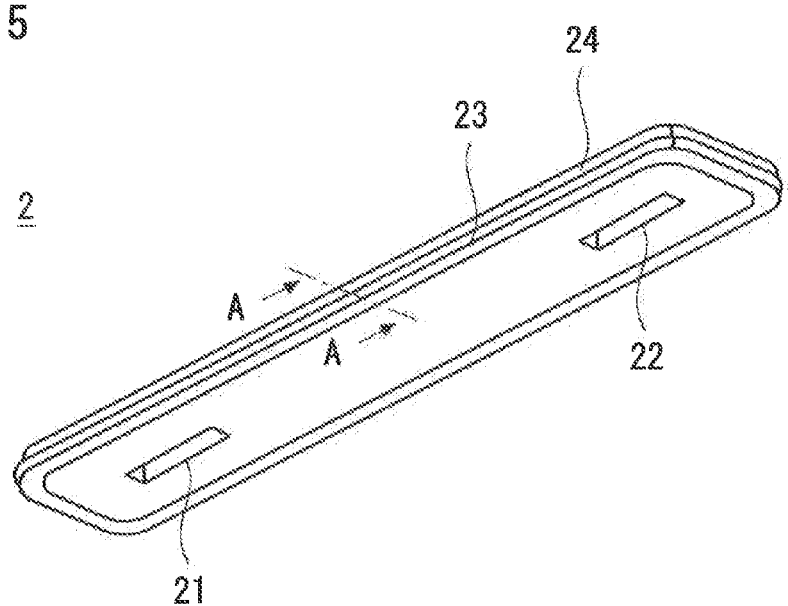
FIG. 5 is a perspective view showing a schematic configuration of a closing member according to an exemplary embodiment of the present invention.

FIG. 5 is a perspective view showing a schematic configuration of a closing member according to this exemplary embodiment. As shown in FIG. 5, the closing member 2 is formed, for example, by using a metal such as aluminum. Further, openings 21 and 22, into which the positive collector terminal 3 and the negative collector terminal 4, respectively, are inserted, are formed in the closing member 2. In the closing member 2, a recessed mating section 23 and a material-shortage section 24 are formed along its outer edge.

Figure 6:
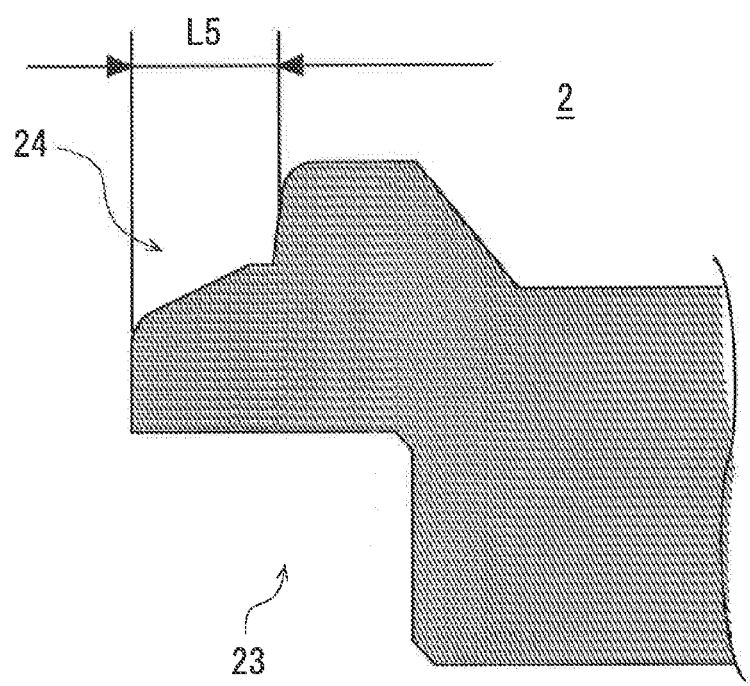
FIG. 6 is an enlarged cross section of a part of the closing member shown in FIG. 5 when the closing member is cut off along the line A-A.

FIG. 6 is an enlarged cross section of a part of the closing member shown in FIG. 5 when the closing member is cut off along the line A-A. The mating section 23 is formed by cutting out a part of the bottom surface side of the closing member 2 along its outer edge. Further, the mating section 23 mates with the opening section 11 of the case member 1.

Figure 12:
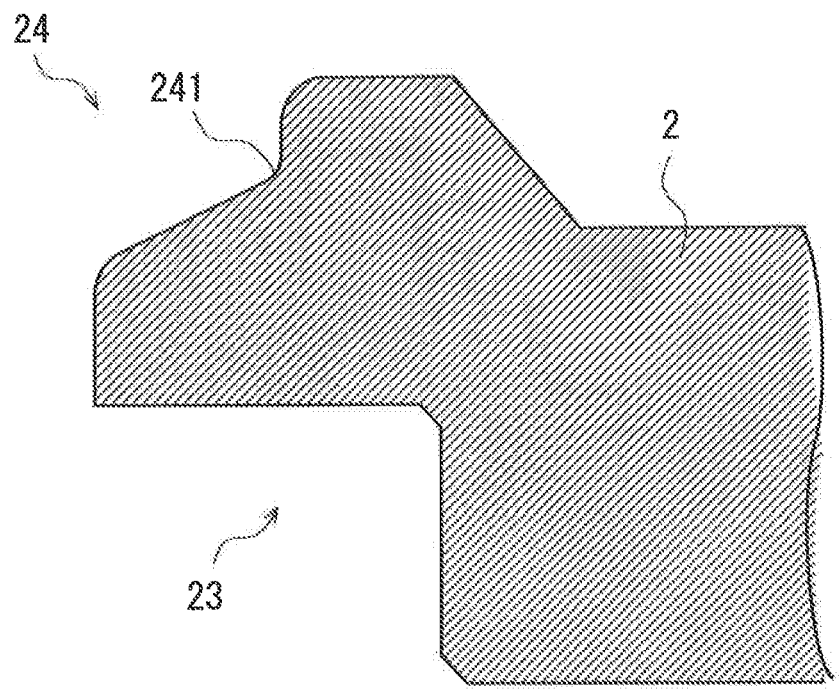
FIG. 12 shows a modified example of a closing member of a battery container according to an exemplary embodiment of the present invention.

The material-shortage section 24 is formed by cutting off a top-surface corner of the closing member 2 by a material-shortage section width L5 n the welding laser (beam) irradiation direction along the outer edge of the closing member 2 near the welding section 13. Further, the material-shortage section 24 is formed roughly above and roughly in parallel with the mating section 23. A corner 241 of the material-shortage section 24, which is formed by cutting off a top-surface corner of the closing member 2, is preferably formed with a curved surface such as an R-shape or a C-shape in order to maintain the strength of the welding section 13 (FIG. 12). Further, the material-shortage section width L5 is preferably equal to or greater than one third of the fusion depth A of the welding section 13 between the closing member 2 and the case member 1 (L5≥A/3). In this way, it is possible to transfer and concentrate the welding heat toward the fusion depth direction even further.

Although the material-shortage section 24 is formed in a groove shape along the entire circumference of the outer edge of the closing member 2, the present invention is not limited to this configuration. For example, the material-shortage section 24 may be intermittently formed only in parts of the outer edge of the closing member 2 where the strength is low. By forming the material-shortage section 24 in parts of the outer edge as described above, it is possible to improve the durability and the sealing property of the battery container 10 even further because the parts where the plate thickness is thin are reduced.

Further, although the material-shortage section 24 is formed near the welding section 13 of the closing member 2, the present invention is not limited to this configuration. For example, the material-shortage section 24 may be formed near the welding section 13 of the case member 1, or near the welding section 13 of the closing member 2 and the welding section 13 of the case member 1.

Figure 7:
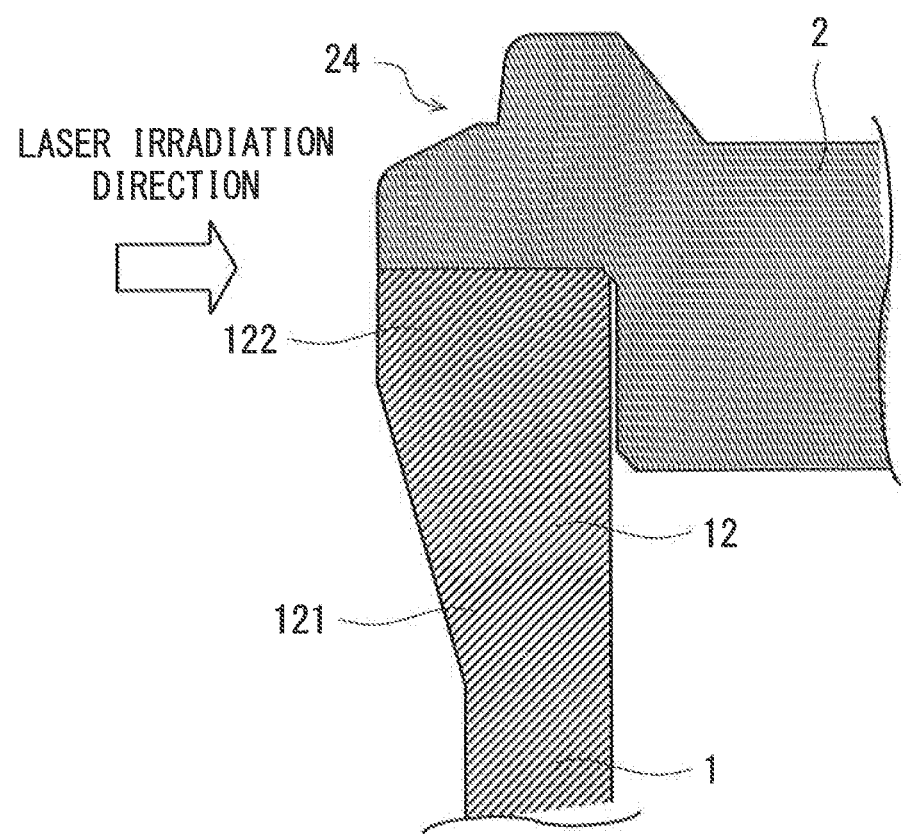
FIG. 7 is an enlarged cross section of a part of a battery container when a case member is mated with the mating section of a closing member and the opening of the case member is thereby closed by the closing member.
Figure 8:
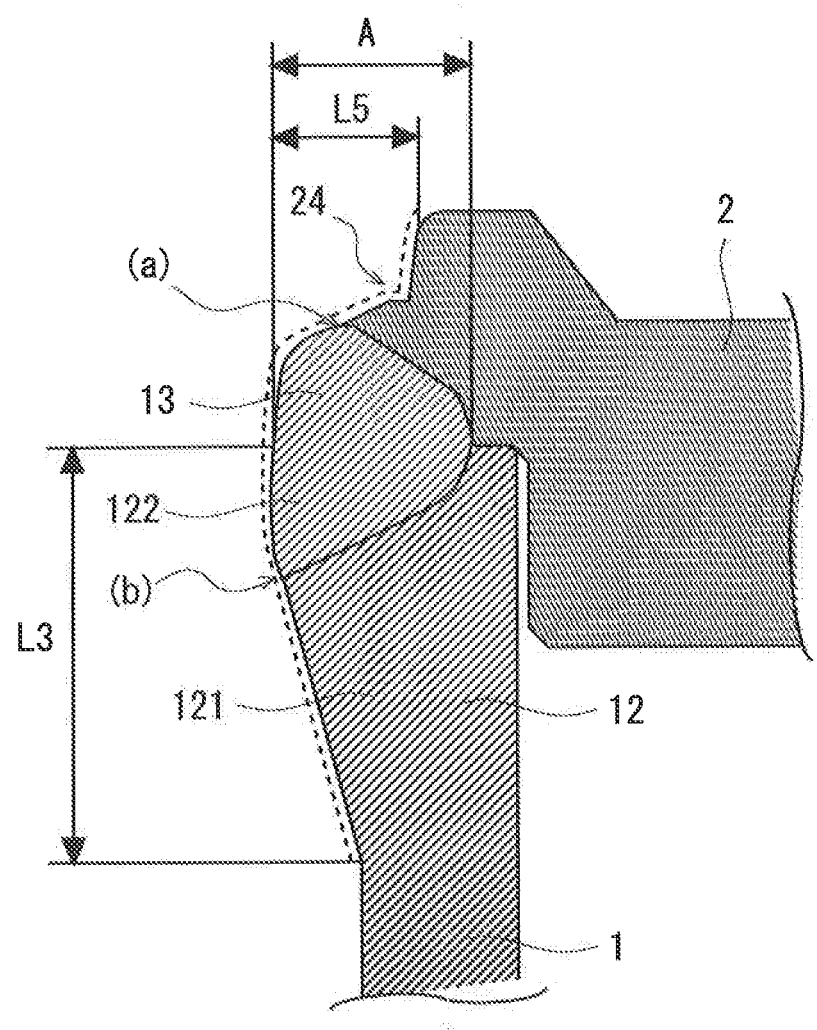
FIG. 8 shows an example state where a case member and a closing member are melted to a fusion depth A and thereby joined with each other.

FIG. 7 is an enlarged cross section of a part of a battery container when the case member is mated with the mating section of the closing member and the opening of the case member is thereby closed by the closing member. In the state shown in FIG. 7, when a laser beam is laterally applied to the wilding section between the case member 1 and the closing member 2 by using a laser welding device or the like, the case member 1 and the closing member 2 are fused to a fusion depth A and thereby joined with each other as shown in FIG. 8.

Note that the above-described laser welding is preferably performed so that (a) the top side (one side) of the welding section 13 reaches the material-shortage section 24 and (b) the bottom side (other side) of the welding section 13 is confined within the range of the thick-wall section 12 of the case member 1 (within the range of the thick-wall section height L3). In this way, it is possible to prevent the welding heat from spreading and thus to transfer and concentrate the welding heat toward the fusion depth direction even further. Further, although a laser welding device is used in this exemplary embodiment, the welding device is not limited to the laser welding device. For example, an electron beam welding device may be used. Further, any welding device capable of emitting an energy beam can be used.

Incidentally, in conventional laser welding between a case member and a closing member, there has been a problem that when the welding energy is simply increased to increase the fusion depth of the welding section, faulty welding (such as pits caused by sputter and voids formed inside the welding section) increases. Further, there has been another problem that since the welding area tends to increase, the fusion depth (residual material) of the faulty welding section decreases. On the other hand, when the welding energy is simply lowered, it is impossible to achieve a sufficient fusion depth for the welding section.

Therefore, in the battery container 10 according to this exemplary embodiment, as described above, the case member 1 is mated with the closing member 2 and a material-shortage section 24 is formed near the welding section 13 where the contacting surfaces of the case member 1 and the closing member 2 are fused. As a result, the welding heat does not spread from the surface of the welding section 13 and is transferred and concentrated toward the fusion depth direction, thus making it possible to achieve a deeper fusion depth A for the welding section 13 with smaller welding energy. That is, it is possible to prevent faulty welding with smaller energy and to achieve a deeper fusion depth A for the welding section 13, thus enabling more optimal welding.

Next, a method for manufacturing a battery container 10 according to this exemplary embodiment is explained in detail.

Firstly, a case member 1 and a closing member 2 are produced. Then, a material-shortage section 24 is formed in the closing member 2 by using a processing method such as press processing. Alternatively, a material-shortage section 24 may be formed in the closing member 2 by cutting-type processing or the like. That is, an arbitrary processing method can be used.

Next, the closing member 2 is mated with the case member 1. After that, the welding section of the closing member 2 and the case member 1, which are mated with each other, is irradiated with a laser by using a laser welding device. As a result, a weld bead(s) is formed in the welding section between the closing member 2 and the case member 1. That is, they are welded by the so-called "keyhole welding".

In the above-described welding, the welding energy of the laser welding device is set so that: the value expressed as "(thick-wall section plate thickness L1)-(general wall plate thickness L2)" is equal to or greater than one third of the fusion depth A of the welding section 13; the value expressed as "(thick-wall section height L3)-(thickness gradually-changing section L4)" is equal to or less than the fusion depth A of the welding section 13; the "material-shortage section width L5" is equal to or greater than one third of the fusion depth A of the welding section 13; the top side of the welding section 13 reaches the material-shortage section 24 of the closing member 2; and the bottom side of the welding section 13 is confined within the range of the thick-wall section 12 of the case member 1. By performing the welding as described above, the welding heat is transferred and concentrated toward the fusion depth direction even further, thus making it possible to achieve a deeper fusion depth with smaller welding energy.

Note that a particularly high sealing property is required for battery containers used in, for example, electric vehicles, hybrid cars, mobile terminals, and so on. Even in such cases, it is possible to provide a battery container 10 having a high sealing property capable of being used for an electric vehicle, a hybrid car, a mobile terminal, and so on by using the battery container manufacturing method according to this exemplary embodiment.

Next, modified examples of the battery container 10 according to this exemplary embodiment are explained in detail.

Figure 9:
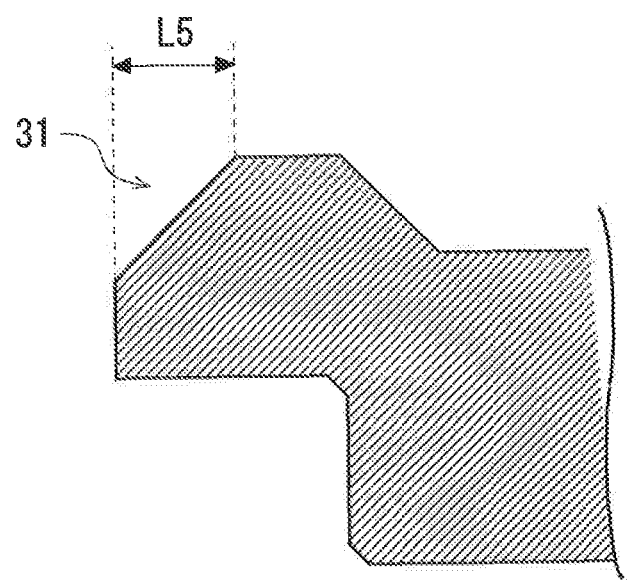
FIG. 9 shows a modified example of a closing member of a battery container according to an exemplary embodiment of the present invention.

In the above-described exemplary embodiment, the material-shortage section 24 is formed by cutting off a top-surface corner of the closing member by a material-shortage section width L5 in an obliquely downward direction near the welding section 13 so that the closing member has a curved-surface corner 241. However, the present invention is not limited to this formation method. For example, a material-shortage section 31 may be formed by cutting off a top-surface corner of the closing member near the wilding section in an oblique direction as shown in FIG. 9.

Figure 10:
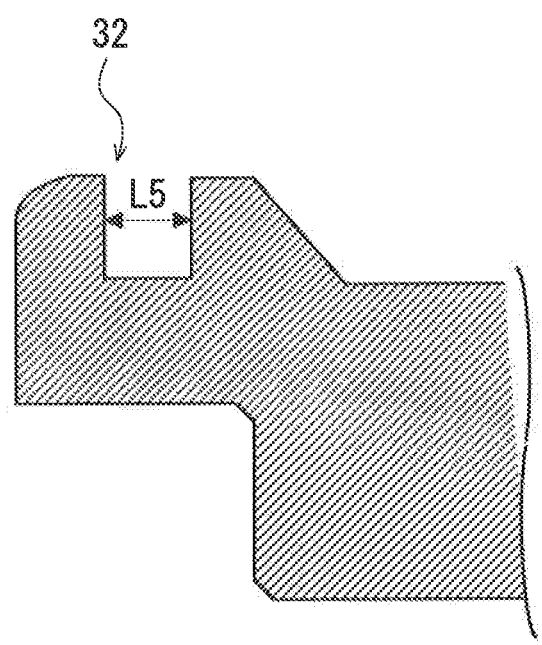
FIG. 10 shows a modified example of a closing member of a battery container according to an exemplary embodiment of the present invention.
Figure 11:
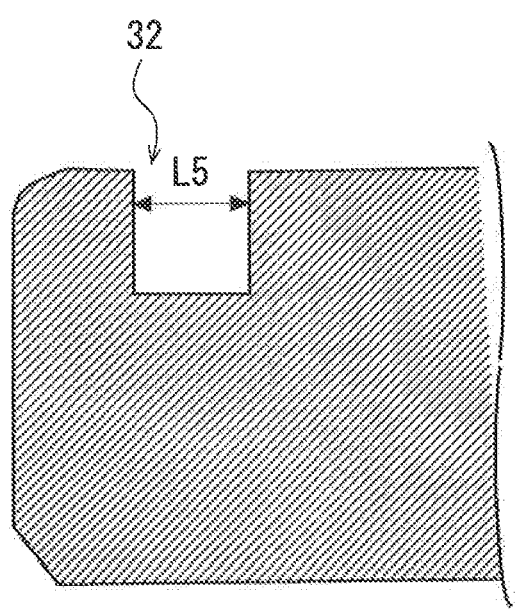
FIG. 11 shows a modified example of a closing member of a battery container according to an exemplary embodiment of the present invention.
Figure 13:
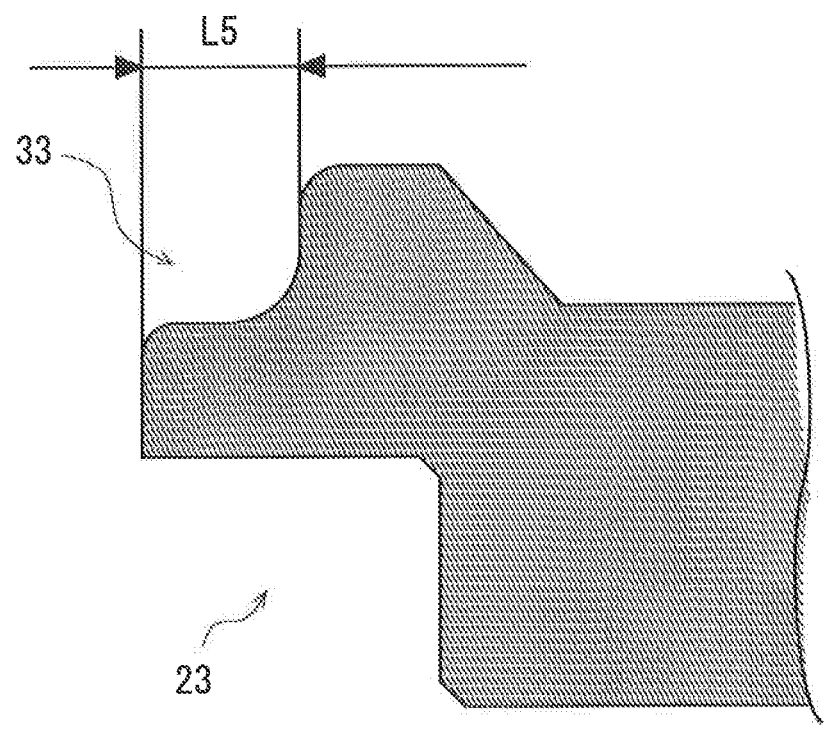
FIG. 13 shows a modified example of a closing member of a battery container according to an exemplary embodiment of the present invention.

In the above-described exemplary embodiment, a material-shortage section 32 may be formed by downwardly cutting out a part of the top surface of the closing member by a material-shortage section width L5 near the welding section 13 as shown in FIG. 10. Further, in the above-described exemplary embodiment, the recessed mating section 23 is formed in the closing member 2. However, the present invention is not limited to this configuration. As shown in FIG. 11, no recessed mating section may be formed in the closing member 2. In this case, the outer surface of the closing member is joined with the inner surface of the case member. Alternatively, a roughly arc-shaped material-shortage section 33 may be formed as shown in FIG. 13.

Figure 14:
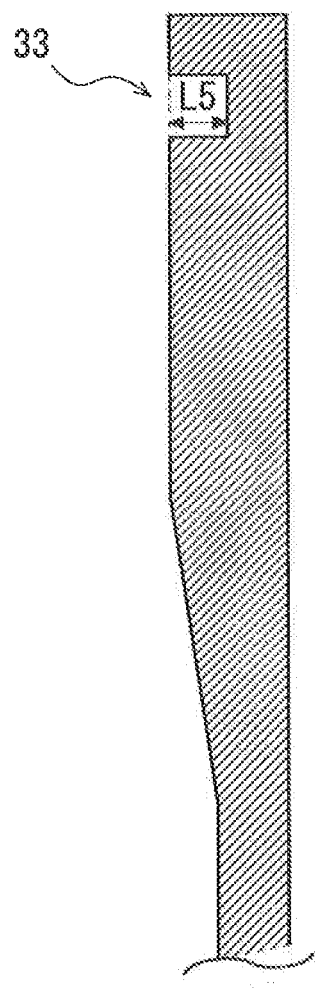
FIG. 14 shows a modified example of a case member of a battery container according to an exemplary embodiment of the present invention.
Figure 15:
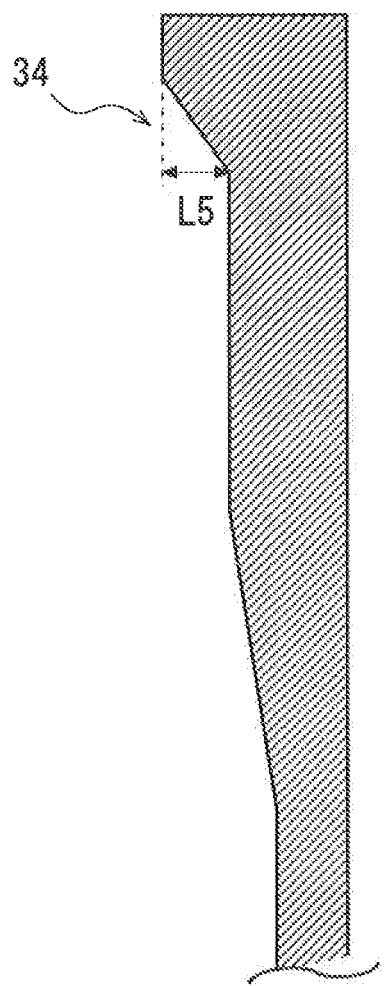
FIG. 15 shows a modified example of a case member of a battery container according to an exemplary embodiment of the present invention.
Figure 16:
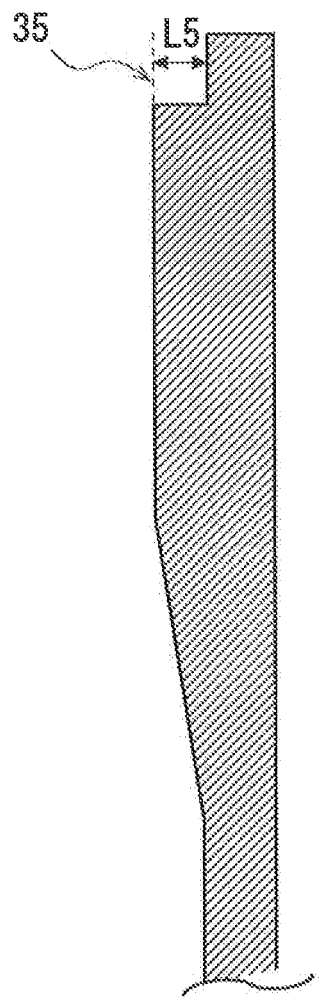
FIG. 16 shows a modified example of a case member of a battery container according to an exemplary embodiment of the present invention.

Although the material-shortage section 24 is formed near the welding section 13 of the closing member 2 in the above-described exemplary embodiment, the material-shortage section may be formed near the welding section of the case member. For example, as shown in FIG. 14, a material-shortage section 33 may be formed by cutting off a part of the outer surface of the case member by a material-shortage section width L5 in a horizontal direction. Further, as shown in FIG. 15, a material-shortage section 34 may be formed by cutting off a part of the thick-wall section of the case member near the welding section in an oblique direction. Further, as shown in FIG. 16, a material-shortage section 35 may be formed by cutting off an upper corner of the thick-wall section of the case member near the welding section. Note that, needless to say, the advantageous effects that the welding heat is transferred and concentrated toward the fusion depth direction and a deeper fusion depth can be achieved with smaller welding energy can also be achieved in the above-described modified examples. Further, the above-described material-shortage sections formed in the closing member 2 and the case member 1 are mere examples, and the present invention is not limited to those examples. For example, the above-described exemplary embodiments may be combined as desired. Further, the material-shortage section can be formed in any place near the wilding section.

As described above, in the battery container 10 according to this exemplary embodiment, the material-shortage section 24 is formed near the welding section 13 where the case member 1 and the closing member 2 are fused and joined with each other. Further, the case member 1 and the closing member 2 are welded so that the top side of the welding section 13 reaches the material-shortage section 24. As a result, the welding heat is transferred and concentrated toward the fusion depth direction, thus making it possible to achieve a deeper fusion depth with smaller welding energy. Therefore, it is possible to significantly reduce the faulty welding and to effectively reduce the loss of the welding energy. Further, by preventing the faulty welding of the welding section between the case member 1 and the closing member 2, the strength of that welding section can be improved. That is, it is possible to perform optimal welding, improve the sealing property of the battery container 10, and improve the reliability of the battery container 10.

Note that the present invention is not limited to the above-described exemplary embodiments and various modifications can be made without departing from the spirit and scope of the present invention.

INDUSTRIAL APPLICABILITY

The present invention can be applied, for example, to battery containers for which a high sealing property is required, such as battery containers used in electric vehicles, hybrid cars, mobile terminals, and so on.

REFERENCE SIGNS LIST

1 CASE MEMBER
2 CLOSING MEMBER
10 BATTERY CONTAINER
11 OPENING SECTION
12 THICK-WALL SECTION
13 WELDING SECTION
23 MATING SECTION
24 MATERIAL-SHORTAGE SECTION
121 THICKNESS GRADUALLY-CHANGING SECTION
122 CONSTANT THICKNESS SECTION
241 CURVED CORNER

The invention claimed is:

1. A battery container comprising:
    a case member, one side of the case member being opened; and
    a closing member for closing the opening, wherein
    a material-shortage section is formed adjacent to a welding section, the case member and the closing member being brought into contact with each other and welded in the welding section by irradiating the welding section with a welding beam,
    the case member is welded with the closing member so that the welding section reaches the material-shortage section,
    a thick-wall section is formed along an irradiation direction of the welding beam, the thick-wall section being thick toward an outer side of the case member or the closing member, and
    the thick-wall section comprises a thickness gradually-changing section and a constant thickness section, the thickness gradually-changing section getting gradually thicker toward an outer side, the constant thickness section being integrally formed with the thickness gradually-changing section and having a constant thickness.

2. The battery container according to claim 1, wherein a width of the material-shortage section in a welding beam irradiation direction is equal to or greater than one third of a fusion depth of the welding section.

3. The battery container according to claim 1, wherein the welding section is welded so that the welding section is confined within a range of the thick-wall section.

4. The battery container according to claim 3, wherein a value obtained by subtracting a thickness of a normal wall other than the thick-wall section from a thickness of the constant thickness section is equal to or greater than one third of a fusion depth of the welding section.

5. The battery container according to claim 4, wherein a value obtained by subtracting a height of the thickness gradually-changing section from a height of the thick-wall section is equal to or less than the fusion depth of the welding section.

6. The battery container according to claim 1, wherein the material-shortage section is formed in a groove shape in at least one of an outer edge of the closing member and the opening of the case member along an entire circumference or intermittently in parts of the outer edge or the opening.

7. The battery container according to claim 1, wherein the material-shortage section is formed by cutting off a top-surface corner of the closing member in an obliquely downward direction along the outer edge of the closing member near the welding section so that the closing member has a curved-surface corner.

8. The battery container according to claim 1, wherein the case member is joined with and hermetically enclosed by the closing member by laser welding.

9. A manufacturing method of a battery container formed by joining a case member whose one side is opened with a closing member for closing the opening by welding, the manufacturing method comprising:

forming a material-shortage section adjacent to a welding section, the case member and the closing member being brought into contact with each other and welded in the welding section by irradiating the welding section with a welding beam, performing the welding so that the welding section reaches the material-shortage section; and forming a thick-wall section along an irradiation direction of the welding beam, the thick-wall section being thick toward an outer side of the case member or the closing member;

wherein the thick-wall section comprises a thickness gradually-changing section and a constant thickness section, the thickness gradually-changing section getting gradually thicker toward an outer side, the constant thickness section being, integrally formed with the thickness gradually-changing section and having a constant thickness.

10. The manufacturing method of a battery container according to claim 9, wherein a width of the material-shortage section in a welding beam irradiation direction is equal to or greater than one third of a fusion depth of the welding section.

11. The manufacturing method of a battery container according to claim 9, wherein the thick wall section is formed in the case member or the closing member, and the welding section is welded so that the welding section is confined within a range of the thick-wall section.

* * * * *